US009809310B2

(12) United States Patent
Sönmez et al.

(10) Patent No.: US 9,809,310 B2
(45) Date of Patent: Nov. 7, 2017

(54) CHILLED AIRCRAFT PASSENGER SERVICE DEVICE

(75) Inventors: Kenan Sönmez, Hamburg (DE); Markus Kerber, Reinfeld (DE); Volker Brakhan, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1735 days.

(21) Appl. No.: 12/992,745

(22) PCT Filed: May 12, 2009

(86) PCT No.: PCT/EP2009/003370
§ 371 (c)(1),
(2), (4) Date: Nov. 15, 2010

(87) PCT Pub. No.: WO2009/138212
PCT Pub. Date: Nov. 19, 2009

(65) Prior Publication Data
US 2011/0067838 A1    Mar. 24, 2011

Related U.S. Application Data

(60) Provisional application No. 61/053,262, filed on May 15, 2008.

(30) Foreign Application Priority Data

May 15, 2008  (DE) .................. 10 2008 023 636

(51) Int. Cl.
*F25B 49/00* (2006.01)
*F25D 15/00* (2006.01)
(Continued)

(52) U.S. Cl.
CPC ........ *B64D 11/0007* (2013.01); *A47F 3/0408* (2013.01); *B64D 13/00* (2013.01); *B64D 2013/0629* (2013.01); *Y02T 50/56* (2013.01)

(58) Field of Classification Search
USPC .......................... 62/132, 237, 382
See application file for complete search history.

(56) References Cited

U.S. PATENT DOCUMENTS 3,850,006 A * 11/1974 Redfern et al. ............ 62/216
5,249,435 A * 10/1993 Lever et al. ............... 62/419
(Continued)

FOREIGN PATENT DOCUMENTS

CN         101155728       4/2008
DE         4105034         8/1992
(Continued)

OTHER PUBLICATIONS

Chinese Patent Office, Chinese Office Action, dated Dec. 4, 2012 (6 pgs).

(Continued)

Primary Examiner — Frantz Jules
Assistant Examiner — Steve Tanenbaum
(74) Attorney, Agent, or Firm — Wood Herron & Evans LLP

(57) ABSTRACT

An aircraft passenger service device for receiving goods for cold storage to be supplied to aircraft passengers includes a receiving device having a viewing apparatus, a coolant inlet for feeding a coolant into the receiving device, and a coolant outlet for discharging the coolant from the receiving device. The viewing apparatus is designed to enable a user to inspect goods stored in the receiving device before removal. The aircraft passenger service device further includes a cooling arrangement having a coolant circuit line connected to the coolant inlet and the coolant outlet of the receiving device, and a device that directs into the coolant circuit line a refrigerant fluid flowing through a refrigerant fluid circuit line of a central cooling system of the aircraft.

9 Claims, 5 Drawing Sheets

(51) Int. Cl.
  F25D 25/02 (2006.01)
  B64D 11/00 (2006.01)
  A47F 3/04 (2006.01)
  B64D 13/00 (2006.01)
  B64D 13/06 (2006.01)

(56) References Cited

U.S. PATENT DOCUMENTS

| | | | | |
|---|---|---|---|---|
| 5,491,979 | A | * | 2/1996 | Kull et al. ............... 62/185 |
| 5,513,500 | A | * | 5/1996 | Fischer et al. ............ 62/239 |
| 5,862,675 | A | * | 1/1999 | Scaringe et al. .......... 62/196.3 |
| 6,209,330 | B1 | * | 4/2001 | Timmerman et al. ....... 62/179 |
| 6,684,657 | B1 | * | 2/2004 | Dougherty ............... 62/237 |
| 6,761,332 | B1 | | 7/2004 | Bengtsson |
| 6,832,502 | B1 | | 12/2004 | Whyte et al. |
| 6,832,504 | B1 | | 12/2004 | Birkman |
| 6,845,627 | B1 | * | 1/2005 | Buck ..................... 62/185 |
| 7,080,520 | B2 | * | 7/2006 | Satzger .................. 62/196.4 |
| 7,284,393 | B1 | * | 10/2007 | Macmillan ............... 62/457.7 |
| 7,444,830 | B2 | * | 11/2008 | Moran et al. ............. 62/371 |
| 7,775,268 | B2 | * | 8/2010 | Sato et al. .............. 165/202 |
| 2003/0005718 | A1 | | 1/2003 | Mitani et al. |
| 2006/0123827 | A1 | * | 6/2006 | Achaichia ............... 62/333 |
| 2006/0196634 | A1 | * | 9/2006 | Sato et al. .............. 165/41 |
| 2006/0219842 | A1 | | 10/2006 | Shell et al. |
| 2007/0283819 | A1 | | 12/2007 | Baatz |
| 2008/0134703 | A1 | * | 6/2008 | Scherer et al. .......... 62/244 |

FOREIGN PATENT DOCUMENTS

| | | |
|---|---|---|
| DE | 4340317 | 6/1995 |
| DE | 19952524 | 5/2001 |
| DE | 60212925 | 3/2007 |
| DE | 102005043610 | 3/2007 |
| DE | 102006013143 | 9/2007 |
| EP | 0655593 | 5/1995 |
| JP | 11243780 | 9/1999 |
| JP | 2006196387 | 7/2006 |
| JP | 2007516889 | 6/2007 |
| RU | 2106584 | 3/1998 |
| RU | 2144165 | 1/2000 |
| WO | 2006105049 | 10/2006 |
| WO | 2007115830 | 10/2007 |
| WO | 2010146678 | 12/2010 |

OTHER PUBLICATIONS

European Patent Office, International Search Report PCT/EP2009/003370, PCT/ISA/210, PCT/ISA/234.
Japanese Patent Office, Japanese Office Action, dated Jul. 16, 2013 (Partial English language translation 3 pgs).
Russian Patent Office, Decision on Granting, dated Jan. 30, 2013 English language translation 4 pgs).

* cited by examiner

CHILLED AIRCRAFT PASSENGER SERVICE DEVICE

This application claims priority to PCT Application No. PCT/EP2009/003370, filed on May 12, 2009, under Section 371 and/or as a continuation under Section 120, which claims priority to German Application No. 10 2008 023 636.5 and U.S. Provisional Application No. 61/053,262, both filed on May 15, 2008.

TECHNICAL FIELD

The invention relates to an aircraft passenger service device for receiving goods for cold storage, such as food and drinks for example, to be supplied to aircraft passengers.

BACKGROUND

In modern passenger aircraft, meals and drinks which are intended to be supplied to the aircraft passengers during a flight are currently stored in trolleys or suitably arranged storage cabinets in the area of the galleys, until they are distributed to the aircraft passengers by the cabin staff. In order to keep the meals and drinks cool prior to their consumption, it is known practice to cool the trolleys or the storage cabinets provided in the area of the galleys with the aid of dry ice. To do so, carbon dioxide snow pressed into the form of blocks is introduced into an upper compartment of a trolley or storage cabinet which is to be cooled, so that goods stored in the trolley or storage cabinet are cooled with the aid of carbon dioxide gas which is produced by sublimation and sinks downwards, impelled by gravity. Cooling by means of dry ice allows independent cooling of the goods received in the trolley or storage cabinet, for which no additional fittings in the area of the galleys or in other areas of the aircraft are necessary. However, the cooling capacity of a dry-ice cooling system is limited by the volume of dry ice available. A further disadvantage of a dry-ice cooling system is the inability to influence the temperature distribution that sets in within the trolley or storage cabinet to be cooled. Finally, the manufacture of dry ice is very energy-consuming and therefore expensive.

In addition, it is known, for example from DE 41 05 034 A1, to cool trolleys for storing food for cold storage which are located in the area of the aircraft's galleys with the aid of independent cooling apparatuses which operate with cold air as the coolant and are each equipped with their own compression-type refrigerating machine (air-chiller). Since the relatively voluminous cooling air lines of these cooling apparatuses are difficult to accommodate in the limited installation space on board an aircraft and, moreover, cause high losses, the air-chillers must each be installed in the area of the galleys, each galley requiring an air-chiller of its own. However, the installation space available in the area of the galleys for additional components is often particularly limited. In addition, the warm waste air from the air-chillers which is produced by the cold-vapour process taking place within these appliances, has to be discharged from the aircraft cabin separately, which makes the integration of the air-chillers in the immediate vicinity of the galleys additionally difficult.

As an alternative to this, DE 43 40 317 C2 for example, describes a central compression-type refrigerating machine whose refrigerating output is distributed, via a refrigerant fluid circuit, to cooling stations arranged in the area of the aircraft's galleys. The cooling stations supplied with cooling energy by the central refrigerating machine give this cooling energy off to trolleys for storing food for cold storage which are located in the area of the galleys, via cooling air circuits which are thermally coupled, via suitable heat exchangers, to the fluid refrigerant circuit of the central refrigerating machine.

The storage of food in cooled trolleys or in cooled storage devices arranged in the area of the galleys has the disadvantage that the food has to be distributed to the passengers by the cabin staff. As a result of this, the supplying of the passengers is very time-consuming and intensive in terms of staff. In addition, it is not possible to guarantee, even with a high deployment of staff, that all the passengers are served at the same time or even at a time they desire. A further disadvantage of the apparatuses currently used in aircraft for storing food to be supplied to aircraft passengers consists in the fact that the passengers are not able, for example when ordering meals, to see the dishes available for selection. This can result in a dish which has been selected on the basis of a verbal description ultimately failing to correspond to expectations.

The underlying object of the invention is to make available an aircraft passenger service device for receiving goods for cold storage, such as food and drinks for example, to be supplied to aircraft passengers, which makes it possible to improve the quality of service for the passengers on board the aircraft without additional input in terms of staff.

SUMMARY OF THE INVENTION

In order to achieve the abovementioned object, an aircraft passenger service device according to the invention for receiving goods for cold storage to be supplied to aircraft passengers comprises a receiving device which may be constructed, for example, in the form of a cabinet having one or more compartments. The goods for cold storage may be food or drinks, but also other goods, which are needed or desired by the passengers on board an aircraft during flight. The receiving device is provided with a viewing apparatus which is designed to enable a user to inspect the goods stored in the receiving device before they are removed from the receiving device. In other words, because of the viewing apparatus, a user can look at the goods stored in the receiving device without it being necessary to open the receiving device. The viewing apparatus may comprise one or more apertures which is/are arranged in a front area of the receiving device, i.e. an area which is accessible to the user. The aperture(s) may be closed by a transparent pane made of glass or of a transparent plastic material. As the material for the pane, use is preferably made of a material having good thermal insulation properties, such as insulating glass for example.

The receiving device may comprise a number of compartments, which can preferably be opened individually, it being possible for the compartments to be both of completely enclosed or open design. The compartments may be configured as drawers but also as inset compartments having a tiltable flap. Such a configuration of the receiving device of the aircraft passenger service device according to the invention makes it possible for the aircraft passengers to look at, for example, the dishes available for selection before ordering the said dishes from the cabin staff. In addition, it is conceivably possible to use the aircraft passenger service device according to the invention as a self-service device in which the aircraft passengers can remove the goods stored in the receiving device from the receiving device themselves at a time they desire. The aircraft passenger service device according to the invention thus makes it possible to increase the quality of service on board a passenger aircraft in a simple manner and without additional input in terms of staff.

The receiving device of the aircraft passenger service device according to the invention further comprises a coolant inlet for feeding a coolant into the receiving device and also a coolant outlet for discharging the coolant from the receiving device. The coolant inlet and the coolant outlet of the receiving device are connected to a coolant circuit line of a cooling arrangement of the aircraft passenger service device according to the invention. The cooling arrangement further comprises a device for thermally coupling a coolant flowing through the coolant circuit line to a refrigerant fluid which flows through a refrigerant fluid circuit line of a central cooling system of the aircraft. In other words, the coupling device brings about the transmission of cooling energy, which is made available by the refrigerant fluid flowing through the refrigerant fluid circuit line of the aircraft's central cooling system, to the coolant used for cooling the goods stored in the receiving device of the aircraft passenger service device according to the invention.

Because of the connection to the central cooling system of the aircraft, the aircraft passenger service device according to the invention can always be supplied with the cooling energy necessary for cooling the goods stored in the receiving device, independently of the aircraft's air-conditioning installation and of the ambient temperature. As a result, it is possible to guarantee high standards of hygiene, particularly when the goods for cold storage are food. In addition, it is possible to dispense with making available separate airchillers or similar refrigerating machines for supplying the aircraft passenger service device according to the invention with cooling energy, a fact which leads to a lighter and more compact construction of the appliance and consequently to greater flexibility in choosing the location for installation and thus in configuring the cabin design. The aircraft passenger service device according to the invention can be installed in all areas of the aircraft cabin, i.e. inside but also outside the galleys and in the under-floor areas. Savings in volume achieved in the configuration of the cooling arrangement can be used to make the receiving device larger and thereby make available a larger receiving volume for goods for cold storage. In addition, the aircraft passenger service device according to the invention is distinguished, in operation, by the development of markedly less noise compared to appliances equipped with separate air-chillers.

The central cooling system of the aircraft which is intended to interact with the aircraft passenger service device according to the invention is constructed as a fluid cooling system, which permits particularly efficient transporting-away of heat. The refrigerant fluid circuit line can therefore have a comparatively small diameter, so that it has a small installation volume and also a low weight and can consequently be successfully integrated into the aircraft. Because of its high efficiency, the cooling system is distinguished by low energy consumption and thus contributes to a reduction in the fuel consumption at aircraft level. In the central cooling system, the generation of refrigeration takes place by means of one or more central refrigerating machines, which is/are preferably arranged outside the pressurised area of the aircraft. As a result, it is possible to give off waste heat generated by the refrigerating machine(s) directly to the outside air. This leads to a considerable relieving of the load on the aircraft's air-conditioning installation.

In the aircraft passenger service device according to the invention, the coolant used for cooling the goods received in the receiving device is essentially conducted in a closed circuit. In practice, at least if the viewing apparatus does not merely have an aperture which is constructed in the receiving device but additionally has a pane which closes said aperture, coolant will pass out of the receiving device of the aircraft passenger service device according to the invention and into the surrounding aircraft cabin at most during the period for which the receiving device is opened for removing the goods stored therein. Consequently, the volume, temperature and distribution of air within the aircraft cabin are not impaired by the aircraft passenger service device according to the invention. In addition, the guidance of the coolant within a more or less closed circuit makes it possible to dispense with a waste heat system which may, under certain circumstances, be noise-intensive and volume-intensive when in operation.

The cooling arrangement of the aircraft passenger service device according to the invention preferably comprises a control device for controlling the temperature and/or the temperature distribution within the receiving device. The control device preferably comprises a temperature sensor or a number of temperature sensors for detecting the temperature and/or the temperature distribution within the receiving device, and also for detecting the temperature of the coolant flowing through the coolant circuit line. The control device may further comprise a sensor for detecting the speed of flow and/or the volume of flow of the coolant through the coolant circuit line. Finally, the control device preferably further comprises a control unit which controls the speed of flow and/or the volume of flow of the coolant through the coolant circuit line and/or the temperature of said coolant flowing through said coolant circuit line, either in dependence upon the measured values made available by the sensors or in dependence upon set values stored in the control unit. It is possible, with the aid of the control device, to set different temperature ranges within the receiving device of the aircraft passenger service device according to the invention. Three temperature ranges, in particular, are relevant, depending upon the particular application: a temperature range of ≤4° C. that corresponds to the so-called "galley cooling requirements", a temperature range that lies below the freezing point of 0° C. and a temperature range above 4° C.

The control device for controlling the temperature and/or the temperature distribution within the receiving device may, for example, comprise a bypass line which is designed to feed heated-up coolant discharged from the receiving device via the coolant outlet of the receiving device, into the coolant circuit line downstream of the device for thermally coupling the coolant flowing through the coolant circuit line to the refrigerant fluid flowing through the refrigerant fluid circuit line of the central cooling system of the aircraft, and upstream of the coolant inlet of said receiving device. In other words, the bypass line is configured in such a way that it is capable of metering coolant which has been heated up because of the transfer of cooling energy to the goods stored in the receiving device, to the coolant which is flowing through the coolant circuit line and has been cooled as a result of the transmission of cooling energy within the coupling device, prior to the entry of said coolant into the coolant inlet of the receiving device. Such a configuration of the control device makes it possible to control the temperature and/or the temperature distribution within the receiving device without the additional introduction of energy from outside, and is therefore particularly energy-efficient. As an alternative to this, however, it is also conceivably possible to feed cooling energy or heating energy from outside to the coolant flowing through the coolant circuit line, as required.

For this purpose, the control device may be provided with an additional source of heating energy or cooling energy.

The control device for controlling the temperature and/or the temperature distribution within the receiving device may further comprise a valve. Said valve may, for example, be arranged in the coolant circuit line and be designed to control the metering of coolant from the bypass line into the coolant circuit line between the coupling device and the coolant inlet of the receiving device. As an alternative to this, the valve may also be designed to thermally couple the coolant flowing through the coolant circuit line to an external source of heating energy or cooling energy, prior to its entry into the coolant inlet of the receiving device. The valve preferably has a variable cross-section of flow. Said valve may, for example, be constructed as a magnetic valve and be controlled by the control unit of the control device.

The coolant flowing through the coolant circuit line may be air or a fluid. If the coolant circuit line is constructed as a cooling fluid circuit line, the fluid flowing through this line is preferably the same fluid as the refrigerant fluid flowing through the refrigerant fluid circuit line of the aircraft's central cooling system. When fluid cooling is used in the cooling arrangement of the aircraft passenger service device according to the invention, said cooling arrangement is distinguished by particularly low-noise operation and is therefore particularly highly suitable if the aircraft passenger service device according to the invention is to be used in the first class or business class area of the aircraft.

In one embodiment of the aircraft passenger service device according to the invention, the coolant inlet and the coolant outlet of the receiving device are directly connected to an area of said receiving device in which the goods stored in the latter are received. An arrangement of this kind is particularly appropriate if air is used as the coolant in the cooling arrangement. The air flowing through the coolant circuit line is then conducted directly over the goods stored in the receiving device ("air through" principle) and, in the process, ensures an adequate feed of cooling energy to the goods and also an adequate discharge of heat from said goods.

As an alternative to this, however, the coolant inlet and the coolant outlet of the receiving device may also be connected to a closed coolant area of said receiving device. In other words, with such a configuration of the aircraft passenger service device according to the invention, the coolant is not conducted directly over the goods stored in the receiving device but flows exclusively through the closed coolant area of said receiving device ("air over" principle). The closed coolant area of the receiving device is preferably configured in such a way that it at least partially surrounds that area of the receiving device in which the goods received in the latter are stored.

A conveying device for conveying the coolant through the coolant circuit line may be arranged in the line. If the coolant flowing through the coolant circuit line is air, the conveying device is preferably constructed in the form of a fan or a blower. If the coolant flowing through the coolant circuit line is a fluid (e.g., a liquid), a pump or the like may, for example, be used as the conveying device if necessary.

The device for thermally coupling the coolant flowing through the coolant circuit line to the refrigerant fluid flowing through the refrigerant fluid circuit line of the central cooling system of the aircraft preferably comprises a heat exchanger. The heat exchanger may be a fluid/air heat exchanger or a fluid/fluid heat exchanger, depending upon the nature of the coolant in the coolant circuit line. Said heat exchanger permits an efficient transmission of cooling energy from the refrigerant fluid flowing through the refrigerant fluid circuit line of the aircraft's central cooling system to the coolant flowing through the coolant circuit line, without direct contact occurring between the refrigerant fluid and the coolant. If the coolant flowing through the coolant circuit line is a fluid, the use of a heat exchanger in the coupling device is particularly appropriate if a different fluid is to be used as the coolant than is used as the refrigerant fluid.

As an alternative, or in addition, to this, the device for thermally coupling the coolant flowing through the coolant circuit line to the refrigerant fluid flowing through the refrigerant fluid circuit line of the central cooling system of the aircraft may be designed to bring about a direct connection of the coolant circuit line to the refrigerant fluid circuit line of the central cooling system of the aircraft. Such a configuration of the coupling device is particularly appropriate if the same fluid is used as the coolant as is used as the refrigerant fluid. If the refrigerant fluid circuit line can be directly connected to the coolant circuit line, a desired quantity of refrigerant fluid can be conducted, from the refrigerant fluid circuit line, through the coolant circuit line of the cooling arrangement of the aircraft passenger service device according to the invention. It may, under certain circumstances, be possible to dispense with an additional conveying device for conveying the cooling fluid through the coolant circuit line, depending upon the pressure conditions in the refrigerant fluid circuit line. An aircraft passenger service device which is configured in this way is distinguished by a particularly simple, lightweight and compact construction and also by particularly low-noise operation.

The device for thermally coupling the coolant flowing through the coolant circuit line to the refrigerant fluid flowing through the refrigerant fluid circuit line of the central cooling system of the aircraft may comprise a controllable valve. Said valve is preferably designed to bring about a connection between the coolant circuit line and the refrigerant fluid circuit line of the aircraft's central cooling system when in a first position, and to interrupt the connection between the coolant circuit line and the refrigerant fluid circuit line of the aircraft's central cooling system when in a second position. The valve, which preferably has a variable cross-section of flow, may be configured, for example, as a magnetic valve. Said valve may also be designed to be controlled by an electronic control unit belonging to a control device for controlling the temperature and/or the temperature distribution within the receiving device. As an alternative to this, however, a separate, preferably electronic control unit may be provided for controlling the valve.

BRIEF DESCRIPTION OF THE DRAWINGS

Preferred exemplified embodiments of an aircraft passenger service device according to the invention will be explained in greater detail below with reference to the appended diagrammatic drawings, in which.

DETAILED DESCRIPTION

Figure 1:
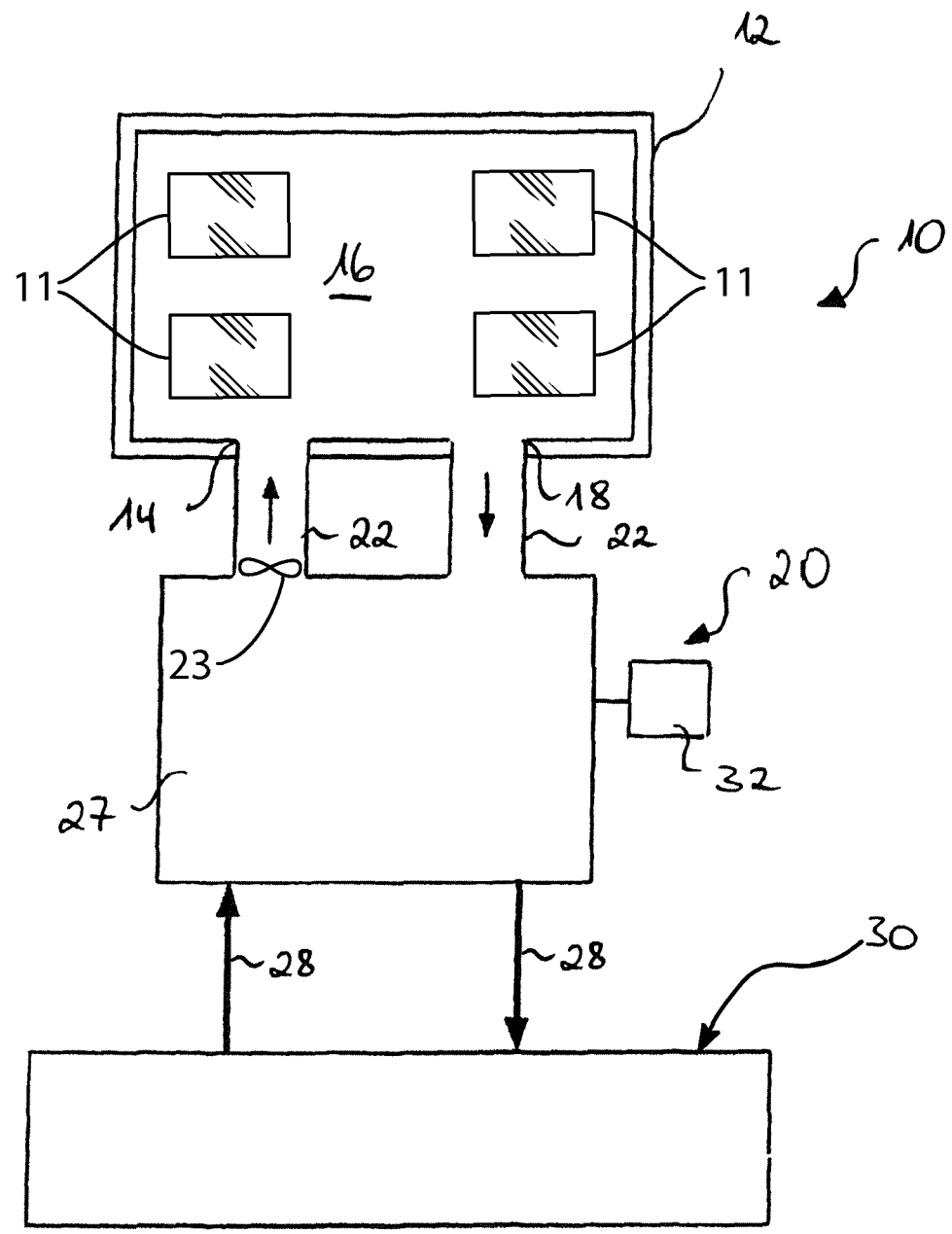
FIG. 1 shows a general representation of an aircraft passenger service device having a cooling arrangement in which air is used as the coolant and is conducted directly through an area of a receiving device, which area is intended for receiving goods.
Figure 2:
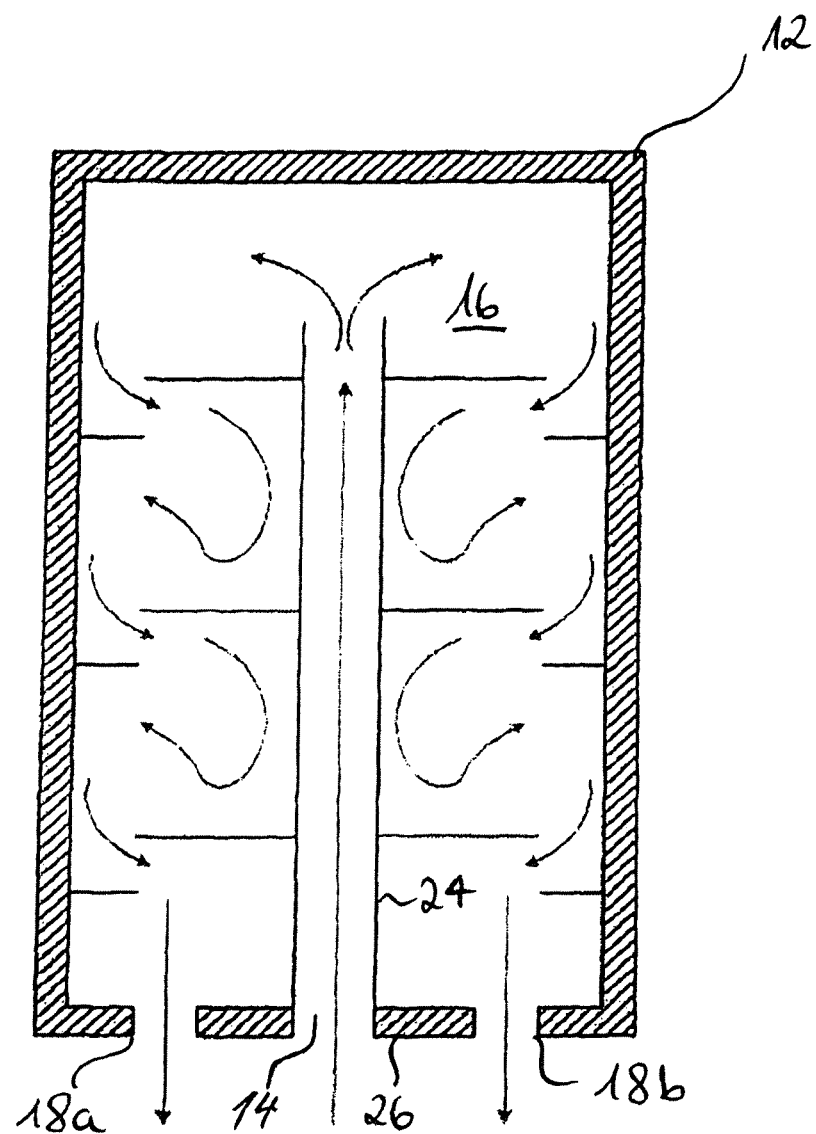
FIG. 2 shows a cross-sectional view of a receiving device belonging to an aircraft passenger service device which is represented in FIG. 1.

An aircraft passenger service device 10 which is shown in FIGS. 1 and 2 comprises a receiving device 12, which is constructed in the form of a cabinet, for receiving goods for cold storage. The goods may, for example, be food or drinks and be used for supplying to aircraft passengers during a flight. As can be inferred from FIG. 2, the receiving device 12 has a number of compartments in which the goods for cold storage can be located. On a front side, i.e. a side which is accessible to a user of the aircraft passenger service device 10, the receiving device 12 is provided with a viewing apparatus 11 which is designed to enable the user to inspect the goods stored in the receiving device 12 before they are removed from the latter. The viewing apparatus 11 may, for example, comprise a pane consisting of insulating glass. The compartments of the receiving device 12 may be accessible individually. As an alternative to this, however, it is also possible to provide the receiving device 12 with merely a single door. The receiving device 12 may be intended exclusively for operation by the cabin staff of the aircraft. As an alternative to this, however, the receiving device 12 may also be used as a self-service device for the aircraft passengers.

The receiving device 12 is provided with a coolant inlet 14 through which a coolant can be conducted directly into an interior space 16 of the receiving device 12, which area is intended to receive the goods to be stored in the latter. A coolant outlet 18 is provided for discharging the coolant from the inner area 16 of the receiving device 12. In the arrangement shown in FIGS. 1 and 2, which operates according to the so-called "air through" principle, air is used as the coolant to be fed to the receiving device 12.

The aircraft passenger service device 10 further comprises a cooling arrangement 20 having a coolant circuit line 22 which connects the coolant inlet 14 and the coolant outlet 18 of the receiving device 12. Within the coolant circuit line 22, the coolant, namely air, is guided in a more or less closed circuit with the aid of a suitable conveying device 23, for example a fan or blower when air is used as the coolant. A "more or less closed circuit" is understood, here, to mean a circuit which permits the emergence of coolant into the surrounding aircraft cabin only when the receiving device 12, or a compartment of the latter, is opened, for example for removing the goods stored therein.

As is shown in FIG. 2, the coolant inlet 14 of the receiving device 12 is connected to a distributing line 24 extending through the interior space 16 of the receiving device 12. With the aid of the distributing line 24, the cold air is conducted from the coolant circuit line 22 into an upper area of the interior space 16 of the receiving device 12. The cold air sinks downwards from this upper area of the interior space 16 of the receiving device and, as it does so, is distributed uniformly within the compartments provided in the interior space 16 of the receiving device 12. In the process, cooling energy is fed to, or heating energy discharged from, the goods stored in the compartments. The discharge of coolant from the interior space 16 of the receiving device 12 takes place through the coolant outlet 18 which is constructed in a base 26 of the receiving device 12 and which, in the form of embodiment of a receiving device 12 shown in FIG. 2, comprises two mutually independent outlet apertures 18a, 18b.

The cooling arrangement 20 of the aircraft passenger service device 10 further comprises a device 27 for thermally coupling the coolant flowing through the coolant circuit line 22 to a refrigerant fluid flowing through a refrigerant fluid circuit line 28 belonging to a central cooling system 30 of the aircraft. In order to ensure a proper transfer of cooling energy from the refrigerant fluid flowing through the refrigerant fluid circuit line 28 of the aircraft's central cooling system 30 to the coolant, namely air, flowing through the coolant circuit line 22, the coupling device 27 comprises a fluid/air heat exchanger, of which no further details are illustrated in FIG. 1.

In addition, the cooling arrangement 20 of the aircraft passenger service device 10 comprises a control arrangement 32 for controlling the temperature and/or the temperature distribution within the interior space 16, which is to be supplied with cooling energy, of the receiving device 12. The control arrangement 32 comprises sensors, which are not shown in FIG. 1, for detecting the temperature in the interior space 16 of the receiving device 12 and also for detecting the temperature of the air flowing through the coolant circuit line 22. The signals generated by the sensors are processed by an electronic control unit. Said electronic control unit controls the temperature and/or the volume flow and/or the speed of flow of the coolant in the coolant circuit line 22 in response to the sensor signals. It is thus possible, with the aid of the control arrangement 32, to always set a desired temperature and temperature distribution within the interior space 16 of the receiving device 12.

Figure 3:
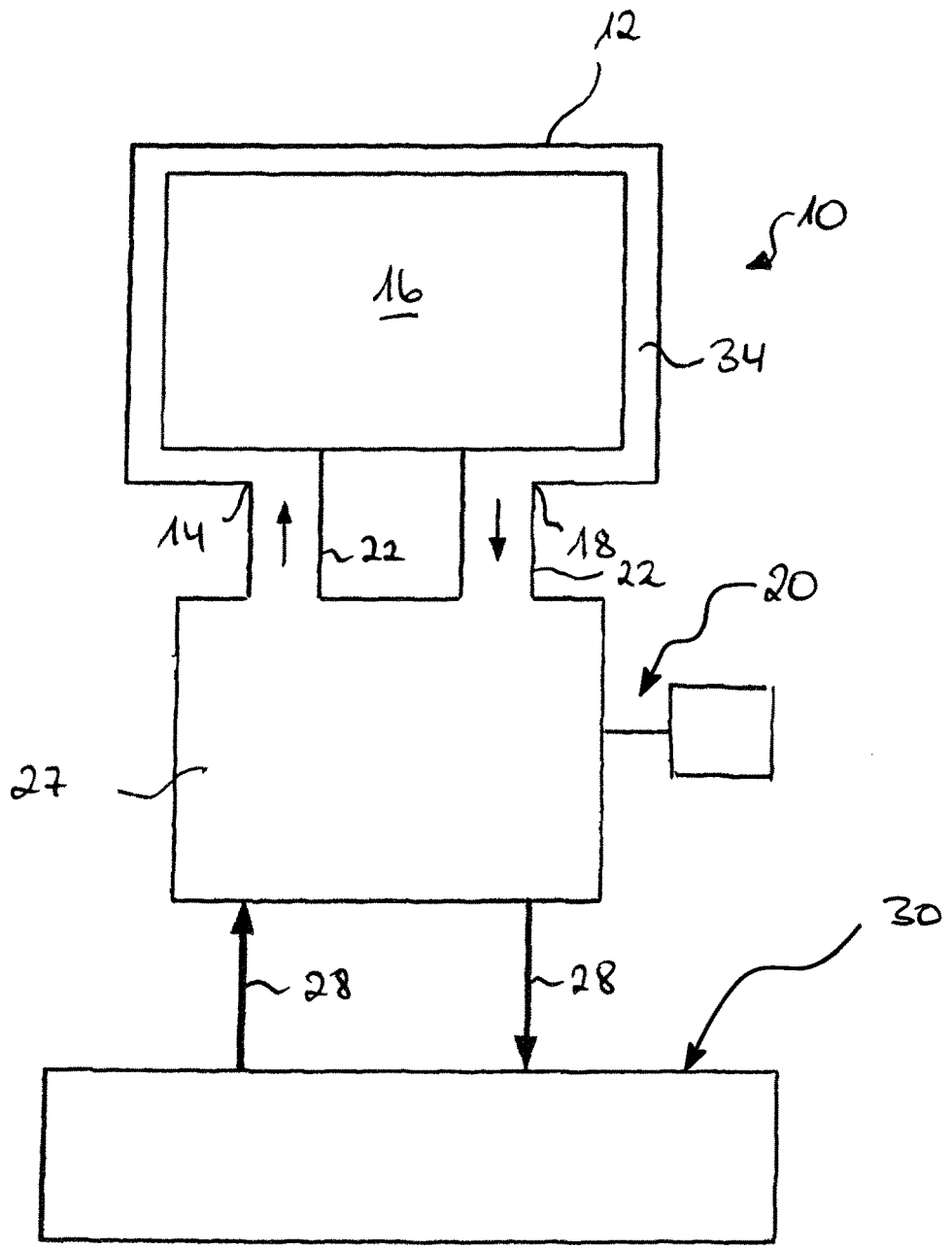
FIG. 3 shows a general representation of an aircraft passenger service device having a cooling arrangement in which air is used as the coolant and is conducted through a closed coolant area of a receiving device.

The aircraft passenger service device 10 shown in FIG. 3 differs from the arrangement according to FIGS. 1 and 2 through the fact that the coolant flowing through the coolant circuit line 22 is not conducted directly into the interior space 16 of the receiving device 12 and over the goods stored therein. Instead, the coolant inlet 14 and the coolant outlet 18 of the receiving device 12 are connected to a closed-off coolant area 34 of said receiving device 12 (the "air over" principle). The closed coolant area 34 is, for example, configured in such a way that it at least partially surrounds that interior space 16 of the receiving device 12 which is intended to receive the goods for cold storage. As a result of that configuration of the aircraft passenger service device 10 which is shown in FIG. 3, a completely closed coolant circuit is produced, i.e. a coolant circuit from which no coolant can pass out into the surrounding aircraft cabin in the course of normal operation. In other respects, the construction and mode of operation of the aircraft passenger service device 10 shown in FIG. 3 correspond to the construction and mode of operation of the arrangement according to FIGS. 1 and 2.

Figure 4:
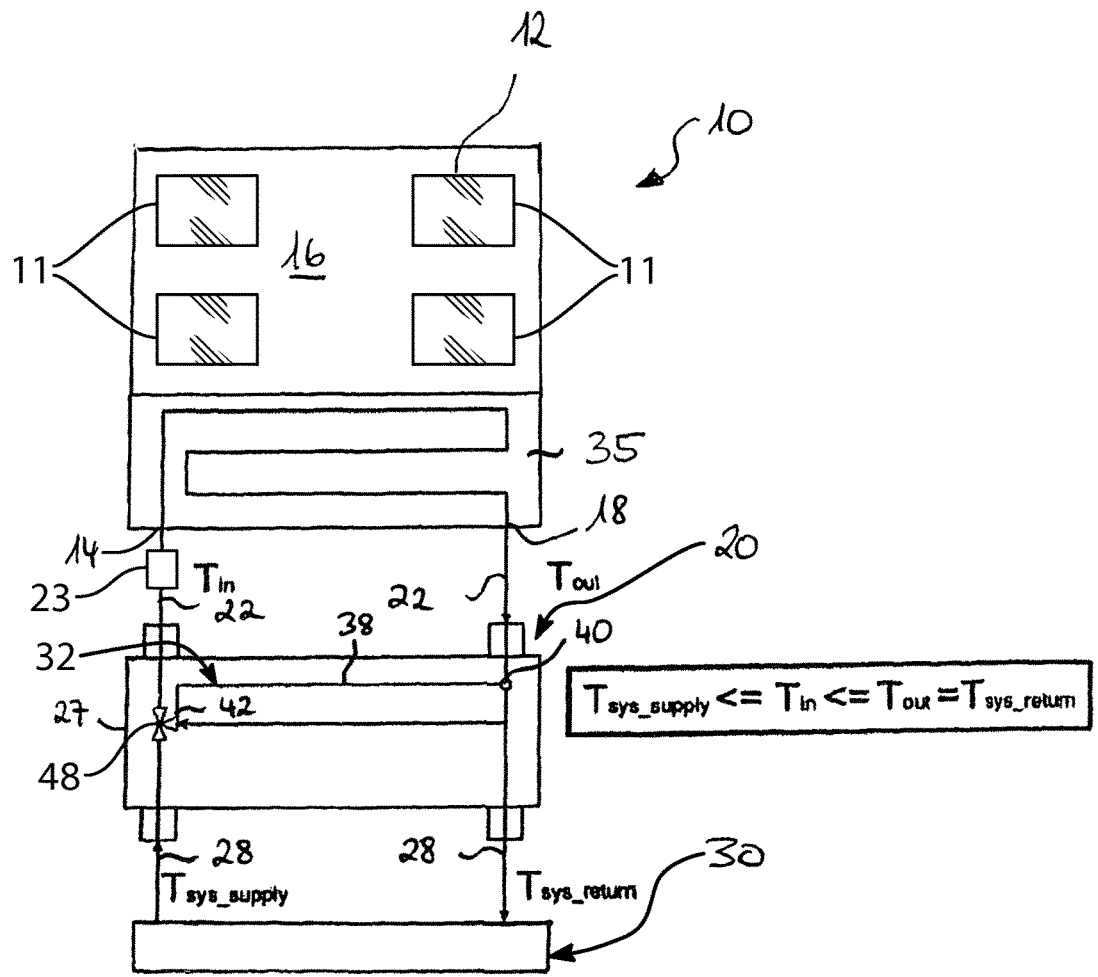
FIG. 4 shows a general representation of an aircraft passenger service device having a cooling arrangement which comprises a coolant circuit line which can be connected directly to a refrigerant fluid circuit line of an aircraft's central cooling system.
Figure 5:
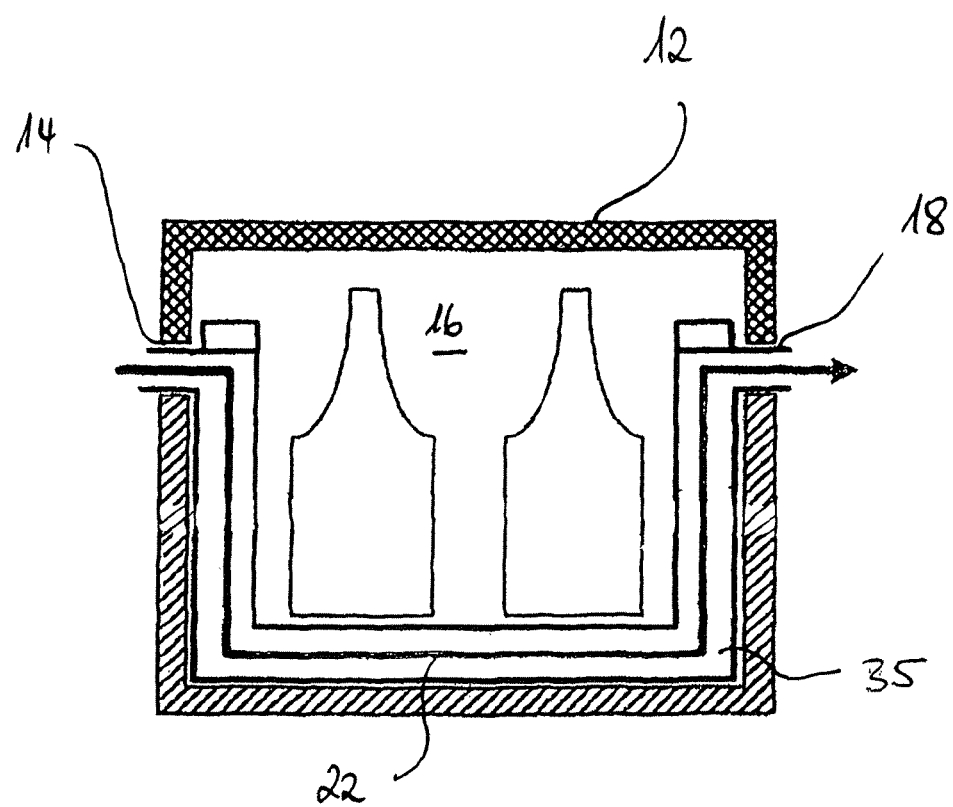
FIG. 5 shows a cross-sectional view of a receiving device belonging to the aircraft passenger service device represented in FIG. 4.

Finally, FIGS. 4 and 5 show an aircraft passenger service device 10 in which a fluid is guided, as the coolant, within the coolant circuit line 22 of the cooling arrangement 20. Said coolant circuit line 22 extends through a closed coolant area 35 which at least partially surrounds the interior space 16 of the receiving device 12 (the "cold plate" principle, see FIG. 5).

Basically, an aircraft passenger service device 10 having a cooling arrangement 20, in the coolant circuit line 22 of which a fluid coolant is used, may have a similar construction to the aircraft passenger service device 10 shown in FIGS. 1 to 3, which is equipped with an air-type cooling arrangement 20. That is to say, even a fluid-type cooling arrangement 20 can comprise a coupling device 27 comprising a heat exchanger and also a temperature control device 32 constructed as described above.

As an alternative to this, however, a fluid-type cooling arrangement 20 may also comprise a coupling device 27 which permits a direct connection of the coolant circuit line 22 of the cooling arrangement 20 to the refrigerant fluid circuit line 28 of the aircraft's central cooling system 30. As is shown in FIG. 4, the coupling device 27 may comprise a valve which, in a first position, brings about a connection between the coolant circuit line 22 and the refrigerant fluid circuit line 28 of the aircraft's central cooling system 30 and, in a second position, interrupts the connection between the coolant circuit line 22 and the refrigerant fluid circuit line 28 of the aircraft's central cooling system 30. The valve may be constructed as a controllable magnetic valve.

In a fluid-type cooling arrangement 20 which makes provision for a direct connection between the coolant circuit line 22 and the refrigerant fluid circuit line 28 of the aircraft's central cooling system 30, the fluid circulating in the coolant circuit line 22 corresponds to the refrigerant fluid flowing through the refrigerant fluid circuit line 28 of the aircraft's central cooling system 30. A fluid-type cooling arrangement 20 which makes provision for a direct connection of the coolant circuit line 22 to the refrigerant fluid circuit line 28 of the aircraft's central cooling system 30 is distinguished by a particularly compact and lightweight construction and also, as a result of dispensing with an additional conveying device for conveying the coolant through the coolant circuit line 22, by particularly low-noise operation.

In addition, FIG. 4 shows a preferred form of embodiment of a control device 32 for controlling the temperature and/or the temperature distribution within the interior space 16 of the receiving device 12. Said control device 32 comprises a bypass line 38. A first end 40 of said bypass line 38 is connected, downstream of the coolant outlet 18 of the receiving device 12 but upstream of the coupling device 27, to the coolant circuit line 22. The bypass line 38 consequently has, flowing through it, coolant which has been heated up as a result of giving off its cooling energy to the goods in the receiving device 12 which are to be cooled. A second end 42 of the bypass line 38 opens, upstream of the coolant inlet 14 of the receiving device 12 and downstream of the coupling device 27, into the coolant circuit line 22. In this context, the expression "downstream of the coupling device 27" is also intended to include the case shown in FIG. 4, in which the second end 42 of the bypass line 38 opens directly into the coolant circuit line 22 in the area of the coupling device 27. All that is essential, as regards the arrangement of the second end 42 of the bypass line 38, is that the heated-up coolant flowing through said bypass line 38 can be metered to the coolant which is flowing through the coolant circuit line 22 and has been cooled down as a result of the transfer of cooling energy into the coupling device 27, prior to its entry into the coolant inlet 14 of the receiving device 12.

In the configuration which is represented in FIG. 4 and is of particularly simple construction, the coupling device 27 comprises a controllable three-way valve 48 which is capable, depending upon its position, of bringing about or interrupting a connection between the coolant circuit line 22 and the refrigerant fluid circuit line 28 of the aircraft's central cooling system 30, and additionally of bringing about or interrupting a connection between the bypass line 38 and the coolant circuit line 22.

The invention claimed is:

1. An aircraft passenger service device for receiving goods for cold storage that are to be supplied to aircraft passengers, the passenger service device comprising:
   a receiving device which includes a viewing apparatus, a coolant inlet for feeding a coolant into the receiving device, and a coolant outlet for discharging the coolant from the receiving device, wherein the viewing apparatus is designed to enable a user to inspect goods stored in the receiving device before they are removed from the receiving device, and
   a cooling arrangement which includes:
      a coolant circuit line connected to the coolant inlet and the coolant outlet of the receiving device, the coolant circuit line circulating the coolant to and from the receiving device,
      a device that directs into the coolant circuit line a refrigerant fluid flowing through a refrigerant fluid circuit line of a central cooling system of the aircraft, thereby mixing the refrigerant fluid and the coolant, and
      a control device that controls at least one of the temperature and the temperature distribution within the receiving device,
      wherein the control device includes a bypass line positioned to feed heated-up coolant discharged from the receiving device via the coolant outlet of the receiving device, into the coolant circuit line at a rejoining location downstream of the device that directs into the coolant circuit line the refrigerant fluid flowing through the refrigerant fluid circuit line and upstream of the coolant inlet of the receiving device.

2. The aircraft passenger service device according to claim 1, wherein the control device comprises a valve.

3. The aircraft passenger service device according to claim 1, wherein the coolant flowing through the coolant circuit line is a fluid.

4. The aircraft passenger service device according to claim 1, wherein the coolant inlet and the coolant outlet of the receiving device are directly connected to an area of the receiving device in which the goods stored in the receiving device are received.

5. The aircraft passenger service device according to claim 1, wherein the coolant inlet and the coolant outlet of the receiving device are connected to a closed coolant area of the receiving device.

6. The aircraft passenger service device according to claim 1, further comprising:
   a conveying device that conveys the coolant through the coolant circuit line and is arranged in the coolant circuit line.

7. The aircraft passenger service device according to claim 1, wherein the device that directs into the coolant circuit line the refrigerant fluid flowing through the refrigerant fluid circuit line further comprises a controllable valve which, in a first position, connects the coolant circuit line and the refrigerant fluid circuit line to mix the coolant and the refrigerant fluid and, in a second position, interrupts connection between the coolant circuit line and the refrigerant fluid circuit line.

8. The aircraft passenger service device according to claim 7, wherein the controllable valve is moveable between positions that selectively (i) connect the bypass line to the coolant circuit line for fluid flow at the rejoining location, and (ii) interrupts connection between the bypass line and the coolant circuit line at the rejoining location.

9. The aircraft passenger service device according to claim 3, wherein the coolant flowing through the coolant circuit line and the refrigerant fluid flowing through the refrigerant fluid circuit line are the same fluid.

* * * * *